United States Patent
Kraszewski et al.

(10) Patent No.: US 10,922,836 B2
(45) Date of Patent: Feb. 16, 2021

(54) METHOD AND SYSTEM FOR DETERMINING A 3D POSITION OF AN OBJECT IN SPACE

(71) Applicant: CARL ZEISS INDUSTRIELLE MESSTECHNIK GMBH, Oberkochen (DE)

(72) Inventors: Maciej Kraszewski, Slupsk (PL); Nils Haverkamp, Aalen (DE); Andrzej Grzesiak, Oberkochen (DE)

(73) Assignee: CARL ZEISS INDUSTRIELLE MESSTECHNIK GMBH, Oberkochen (DE)

( * ) Notice: Subject to any disclaimer, the term of this patent is extended or adjusted under 35 U.S.C. 154(b) by 381 days.

(21) Appl. No.: 15/812,037

(22) Filed: Nov. 14, 2017

(65) Prior Publication Data
US 2018/0137646 A1 May 17, 2018

Related U.S. Application Data

(63) Continuation-in-part of application No. 15/351,679, filed on Nov. 15, 2016, now Pat. No. 9,934,592.

(30) Foreign Application Priority Data

Mar. 10, 2017 (DE) .................... 10 2017 105 158

(51) Int. Cl.
*G06T 7/73* (2017.01)

(52) U.S. Cl.
CPC ...... *G06T 7/73* (2017.01); *G06T 2207/10024* (2013.01); *G06T 2207/30164* (2013.01); *G06T 2207/30204* (2013.01)

(58) Field of Classification Search
CPC ............. G06T 7/73; G06T 2207/10024; G06T 2207/30164; G06T 2207/30204
See application file for complete search history.

(56) References Cited

U.S. PATENT DOCUMENTS 5,751,843 A 5/1998 Maggioni et al.
6,330,356 B1 * 12/2001 Sundareswaran ........ G06T 3/00
 345/648

(Continued)

FOREIGN PATENT DOCUMENTS

WO WO-2005106769 A2 11/2005
WO WO-2016071227 A1 5/2016

OTHER PUBLICATIONS

Xu, Anqi, and Gregory Dudek. "Fourier tag: A smoothly degradable fiducial marker system with configurable payload capacity." In 2011 Canadian Conference on Computer and Robot Vision, pp. 40-47. IEEE, 2011. (Year: 2011).*

(Continued)

*Primary Examiner* — Carol Wang
(74) *Attorney, Agent, or Firm* — Harness, Dickey & Pierce, P.L.C.

(57) ABSTRACT

A specimen of an artificial marker is arranged on an object, the position of which is to be determined. The artificial marker defines a nominal marker pattern with nominal characteristics. The specimen embodies the nominal marker pattern with individual characteristics. One or more images of the specimen are captured while the specimen is arranged on the object. An image representation of the specimen is analyzed using a data set. The data set comprises measured data values representing the individual characteristics as individually measured on the first specimen. Position values representing a 3D position of the specimen relative to a coordinate system are determined. A 3D position of the object is determined based on the position values of the specimen.

20 Claims, 7 Drawing Sheets

(56) References Cited

U.S. PATENT DOCUMENTS

| | | |
|---|---|---|
| 6,724,930 B1 | 4/2004 | Kosaka et al. |
| 6,792,370 B2 | 9/2004 | Satoh et al. |
| 7,231,063 B2 | 6/2007 | Naimark et al. |
| 7,242,460 B2 | 7/2007 | Hsu et al. |
| 7,257,237 B1 | 8/2007 | Luck et al. |
| 7,698,094 B2 | 4/2010 | Aratani et al. |
| 7,881,767 B2 | 2/2011 | Strommer et al. |
| 8,422,777 B2 | 4/2013 | Aller |
| 8,948,471 B2 | 2/2015 | Fichtinger et al. |
| 9,002,062 B2 | 4/2015 | Aller |
| 9,135,513 B2 | 9/2015 | Takemoto et al. |
| 9,292,755 B2 | 3/2016 | Aller |
| 9,369,689 B1* | 6/2016 | Tran ................ G06T 7/593 |
| 9,934,592 B1 | 4/2018 | Bodjanski et al. |
| 2004/0258306 A1 | 12/2004 | Hashimoto |
| 2005/0234333 A1* | 10/2005 | Takemoto .......... G02B 27/017 600/426 |
| 2006/0004280 A1* | 1/2006 | Kotake ................ G06K 9/32 600/414 |
| 2007/0081695 A1* | 4/2007 | Foxlin ................ G06T 7/73 382/103 |
| 2008/0243416 A1* | 10/2008 | Bryll ................ G01C 11/06 702/95 |
| 2008/0262345 A1 | 10/2008 | Fichtinger et al. |
| 2010/0017178 A1* | 1/2010 | Tsuk ................ G01B 11/24 703/6 |
| 2011/0268322 A1* | 11/2011 | Clausen ............ G01B 11/25 382/106 |
| 2012/0287287 A1* | 11/2012 | Grossmann ........ H04N 17/002 348/181 |
| 2014/0148820 A1* | 5/2014 | Ogawa ................ A61B 17/29 606/130 |
| 2015/0125033 A1 | 5/2015 | Murphy et al. |
| 2015/0329221 A1* | 11/2015 | Georgeson ........ G01N 29/0654 702/36 |
| 2016/0267661 A1* | 9/2016 | Moteki ................ G06T 7/73 |
| 2016/0321530 A1* | 11/2016 | Troy ................ G06F 3/1454 |
| 2017/0249745 A1* | 8/2017 | Fiala ................ G06K 9/00671 |
| 2017/0278237 A1 | 9/2017 | Lovberg et al. |
| 2019/0236806 A1* | 8/2019 | Jiang ................ G06F 17/16 |

OTHER PUBLICATIONS

Sattar, Junaed, Eric Bourque, Philippe Giguere, and Gregory Dudek. "Fourier tags: Smoothly degradable fiducial markers for use in human-robot interaction." In Fourth Canadian Conference on Computer and Robot Vision (CRV'07), pp. 165-174. IEEE, 2007. (Year: 2007).*

Bradley et al., Oct. 2004, "Tracking a sphere with six degrees of freedom". pp. 1-24.

Jiang et al., 2002, "A simulation study of the degrees of freedom of movement in reaching and grasping". pp. 881-904.

Lilian Calvet et al.; Detection and Accurate Localization of Circular Fiducials under Highly Challenging Conditions; 2016; pp. 562-570.

Johannes Köhler et al.; Detection and Identification Techniques for Markers Used in Computer Vision; 2010; 9 pp.

European Search Report; dated Feb. 12, 2018; 13 pp.

* cited by examiner

METHOD AND SYSTEM FOR DETERMINING A 3D POSITION OF AN OBJECT IN SPACE

CROSS-REFERENCE TO RELATED APPLICATIONS

The present application is a continuation-in-part of U.S. Ser. No. 15/351,679 filed on Nov. 15, 2016 and claims priority from this prior application. The present application further claims priority under the Paris Convention from German patent application No. 10 2017 105 158.9 filed on Mar. 10, 2017. The whole content of these prior applications is incorporated herein by reference.

BACKGROUND OF THE INVENTION

The present invention relates to a method and a system for determining a 3D position of an object in space using one or more 2D artificial markers having defined features. At least one such marker is arranged on the object and at least one image of the artificial marker is captured while the at least one marker is arranged on the object. Using image processing technologies, a 3D position and, in some preferred implementations, a 3D-orientation of the artificial marker in space can be determined.

Determining both 3D position and 3D orientation of an object in space requires determining at least 6 parameters which represent 6 degrees of freedom (DOF), namely 3 parameters representing the 3D position along three axes of a 3D coordinate system and 3 further parameters representing angular orientation about any of the three axes. Typically, the 3D coordinate system is defined relative to the at least one camera by using appropriate calibration. In the following, the term "6-Degree-of-Freedom-(DOF) pose" or simply "pose" is used to designate both 3D position and 3D orientation of an object relative to a defined coordinate system. While determining the 6-DOF-pose of an object might be desired in many situations, the present invention is not restricted to this. It can likewise be used in situations where a 3D position is sufficient to be determined.

International patent application WO 2016/071227 A1, which is assigned to the assignee of the present invention, discusses some prior art and a new approach for determining 3D position and orientation of an object in space using artificial markers, which are called optical tracking markers. According to the prior art, the optical-tracking markers often have a black-and-white chessboard pattern (checkered flag pattern), and the centroid of the marker is typically defined by an intersection of straight edges or lines formed between alternating bright and dark regions of the pattern. Typically, the centroid of the checkered pattern marker is estimated as a position of the marker within the 2D-image captured by the camera. For determining a 6-DOF-pose of an object, a plurality of markers and/or a plurality of cameras for capturing various marker images are required.

WO 2016/071227, in contrast, proposes optical-tracking markers having a substantially continuous or "analog" pattern comprising greyscale values or color-values which vary in accordance with a non-binary multitone characteristic along a circular path around the marker centroid. Image analysis of such marker patterns allows for improved accuracy. In addition, a plurality of markers can be individually coded and distinguished from one another by using different analog marker patterns. The approach of WO 2016/071227 has already proved to be successful, but there is still room for further improvement. In particular, it is desirable to further improve the accuracy in the determination of the 3D position and/or 3D orientation of an object bearing the marker.

A conference paper titled "Detection and Accurate Localization of Circular Fiducials under Highly Challenging Conditions" by Lilian Calvet, Pierre Gurdjos, Carsten Griwodz, Simone Gasparini from The IEEE Conference on Computer Vision and Pattern Recognition (CVPR), 2016, pp. 562-570, proposes optical-tracking markers (termed as fiducials) having a plurality of circular, concentric black-and-white rings. In one academic example, a circular marker having a single ring painted with a continuous gradation of greyscale values is examined. Paths in the marker imager are created such that the directions of path segments are given by image gradients.

The known methods and systems still leave room for improvement, especially with respect to accuracy, detection speed and costs of implementation.

SUMMARY OF THE INVENTION

Against this background, it is an object of the present invention to provide a method and a system for determining a 3D position of an object in space with improved accuracy.

It is another object to provide a method and a system for determining a 6-DOF-pose of an object in space with high accuracy in a cost-effective manner.

According to a first aspect of the invention, there is provided a method for determining a 3D position of an object in space, the method comprising the steps of arranging a first specimen of a first artificial marker on the object, the first artificial marker defining a first nominal marker pattern with first nominal characteristics, and the first specimen embodying the first nominal marker pattern with first individual characteristics, providing at least one camera and a coordinate system relative to the at least one camera, providing a data set which is representative for the first specimen, capturing at least one image of the first specimen arranged on the object using the at least one camera, the at least one image comprising an image representation of the first marker pattern as embodied by the first specimen, detecting and analyzing the image representation using the data set, thereby producing a number of first position values representing a 3D position of the first specimen relative to the coordinate system, and determining the 3D position of the object on the basis of the first position values, wherein the data set comprises first measured data values representing the first individual characteristics as individually measured on the first specimen.

According to another aspect, there is provided a method for determining a 3D position of an object in space, the method comprising the steps of providing the object with an optical-tracking target which comprises a first specimen of a first artificial marker and a second specimen of a second artificial marker, said first specimen having a first marker pattern with first individual characteristics, and said second specimen having a second marker pattern with second individual characteristics, providing at least one camera and a coordinate system relative to the at least one camera, providing a data set which is representative for the first specimen and the second specimen, capturing at least one image of said optical-tracking target on the object using the at least one camera, the at least one image comprising an image representation of the first and second specimens, detecting and analyzing the image representation using the data set, thereby producing a number of target position values representing a 3D position of the optical-tracking target relative to the coordinate system, and determining the 3D position of the object on the basis of the target position values, wherein the data set comprises first measured data values representing at least some of the first individual characteristics as individually measured on the first specimen, and comprises second measured data values representing at least some of the second individual characteristics as individually measured on the second specimen.

According to yet another aspect, there is provided a system for determining a 3D position of an object in space, the system comprising a first specimen of a first artificial marker configured to be arranged on the object, the first artificial marker defining a first nominal marker pattern with first nominal characteristics, and the first specimen embodying the first nominal marker pattern with first individual characteristics, comprising at least one camera, comprising a coordinate system defined relative to the at least one camera, and comprising a control and evaluation unit having a processor and a data memory, the memory storing a data set which is representative for the first specimen, the processor being programmed to capture at least one image of the first specimen arranged on the object using the at least one camera, the at least one image comprising an image representation of the first marker pattern as embodied by the first specimen, the processor being further programmed to detect and analyze the image representation using the data set from the memory, thereby producing a number of first position values representing a 3D position of the first specimen relative to the coordinate system, and the processor being further programmed to determine the 3D position of the object on the basis of the first position values, wherein the data set comprises first measured data values representing the first individual characteristics as individually measured on the first specimen.

Advantageously, the new methods and the new system are implemented by means of at least one camera which is connected to a processing unit, where an appropriate computer program is stored and executed. The computer program enables the processing unit to provide the following functionality: defining a coordinate system relative to the at least one camera, capturing at least one image of a first specimen arranged on the object using the at least one camera, the at least one image comprising an image representation of a first marker pattern as embodied by a first specimen, retrieving a data set which is representative for the first specimen from a memory, detecting and analyzing the image representation using the data set thereby producing a number of first position values representing a 3D position of the first specimen relative to the coordinate system, and determining the 3D position of an object on the basis of the first position values, wherein the data set comprises first measured data values representing first individual characteristics as individually measured on the first specimen.

The new method and the new system thus employ at least one artificial marker attached to the object or arranged on the object in some way. The artificial marker may be a print-out on an adhesive film which can be attached to the object, or it may be printed onto a rigid structure which forms part of the object or is secured to the object. For instance, the artificial marker may be arranged on a ceramics plate which is secured to the object.

The new method and the new system further employ a data set containing data that describes individual characteristics of just that specimen of the artificial marker that is arranged on the object. If more than one specimen is arranged on the object, the data set preferably describes the individual characteristics of a corresponding plurality of marker specimens. The data set may advantageously describe one or more lateral dimensions of the one or more marker specimens, such as a radius of a circular marker area. The data set may also describe the position of the one or more marker specimens as individually measured with respect to a defined reference point. The data set may further describe geometrical characteristics, such as a circularity or deviations from a desired ideal circularity of a circular marker area. In general, the data set contains data that is individually measured on the individual specimen or on the individual specimens of the artificial markers used on the object. Therefore, the new method and the new system can advantageously take into account these specific individual data when it comes to determining the position (or pose which includes the position) of the marker specimen and, based on that, of the object. Taking into account the individual characteristics of the specimens used on the object allows for higher accuracy in the position determination, because errors and/or variations in the production process of the marker specimen are taken into account. This is particularly useful in combination with the approach for evaluating the marker image described further down below in connection with some preferred exemplary embodiments.

In a preferred refinement of the invention, the first nominal marker pattern defines a first lateral dimension, and the first measured data values represent the first lateral dimension as individually measured on the first specimen.

A lateral dimension is a 1D information that characterizes, at least partially, the individual marker specimen. This 1D information can easily and cost effectively be retrieved from the marker image captured by the camera. Since the image representation of the lateral dimension is dependent on the distance and on the viewing angle of the camera relative to the marker specimen, evaluating the image representation of the measured lateral dimension is beneficial for determining the position of the marker specimen in space. Exploiting an individually measured lateral marker dimension advantageously helps to increase accuracy in the position determining process.

In a further refinement, a second specimen of a second artificial marker is arranged on the object, said second artificial marker defining a second nominal marker pattern with second nominal characteristics, and said second specimen embodying the second nominal pattern with second individual characteristics.

This refinement uses at least two marker specimens on the object, and the data set contains individual specimen data for each of those at least two marker specimens. This refinement provides more true a priori knowledge about the object, and this allows for even higher accuracy in the position determination.

In a further refinement, the first nominal marker pattern defines a first center point, the second nominal marker pattern defines a second center point, and the first measured data values further represent a position of the first center point relative to the second center point as individually measured on the first and second specimens.

In this refinement, advantageous use of the at least two marker specimens is made. In particular, a relative position of the first marker specimen, as individually measured and provided in the data set, can advantageously be used in the process of determining the object position with high accuracy.

This is particularly true if the first specimen and the second specimen are fixedly arranged on a common support plate, because the common support plate thus serves as a target having known 2D information that can advantageously be exploited.

In a further refinement, the support plate comprises a plurality of further specimens of further artificial markers, wherein the first specimen, the second specimen and the plurality of further specimens form a defined target plate pattern on the common support plate. The target plate pattern may comprise a plurality of marker specimens arranged in columns and rows on the common support plate in some exemplary embodiments. In presently preferred exemplary embodiments, the plurality of marker specimens form an elliptical or circular target plate pattern. Preferably, the plurality of marker specimens are arranged on the common support plate with a spatial density as high as possible. In other words, the plurality of marker specimens are preferably arranged on the common support plate as close as possible to each other, but still maintaining mutual distances sufficient to avoid overlap. Preferably, the plurality of marker specimens are arranged with respective mutual spacing of less than the marker specimen diameter, and even more preferred with a respective mutual spacing of less than the marker specimen radius.

This refinement provides an even higher amount of a priori knowledge, namely the individual characteristics of a plurality of marker specimens and their mutual relationships. Arranging the marker specimens in a defined pattern on a common support plate facilitates the evaluation of the relative positions. This can advantageously be used for achieving an even higher accuracy in the process of position determination. Arranging the plurality of markers in an elliptical or even circular pattern allows for a reduced image processing effort, because any rotations of the common support plate relative to the camera coordinate system can be handled easier. The amount of pixel data to be processed can be kept rather low.

In a further refinement, the first nominal marker pattern and the second nominal marker pattern are different from one another.

This refinement allows to easily distinguish the first and second marker specimens in the camera image and thus helps to make the new system and method more efficient and accurate. If a plurality of marker specimens are arranged on a common support plate, it is preferred, however, that the number of different nominal marker patterns used is kept low. For example, the plurality of marker specimens may advantageously comprise a plurality of first marker specimens each having the first nominal marker pattern and a single second marker specimen having the second nominal marker pattern, which is different from the first nominal marker pattern.

In a further refinement, the first nominal marker pattern comprises a first circular contour having a circle radius and a circle center point, and the first individual characteristics comprise the circle radius and a position of the circle center point as individually measured on the first specimen.

This refinement allows a very favorable image analysis approach exploiting a 2D correspondence between the circular contour of the marker specimen and its generally elliptical representation in the camera image due to the perspective distortion. In other words, this refinement makes beneficial use of a correspondence between a 2D-characteristic of the marker specimen and the corresponding 2D-representation in the camera image, while many prior art systems and methods only exploit a 1D correspondence between a singular point of the marker and its corresponding representation in the camera image. Determining and exploiting a correspondence between 2D-characteristics of the marker and the marker image allow for higher accuracy and for a space and cost saving implementation using only one marker and one camera.

In a further refinement, the first nominal marker pattern comprises an intensity profile that varies substantially continuously along a circular path around the circle center point, the intensity profile defining a first characteristic feature as part of the first nominal characteristics.

A marker specimen with such a marker pattern distinguishes from almost any markers proposed in the prior art. While prior art markers typically have binary patterns, such as a checkered flag pattern, the marker pattern according to this refinement has a substantially analog nature. "Substantially analog" means in this context that the marker pattern includes multiple different intensity values which are perceived as analog or at least almost analog by the human eye from a certain distance. In some exemplary embodiments, the marker pattern includes at least $2^5=32$ different intensity values. The skilled person will acknowledge, however, that digital printing technologies may create some sort of a small step profile along the circular path, which is not truly analog in a strict sense. In any case, the marker pattern is a multitone pattern and therefore carries a high amount of information, which is advantageous both for individually coding a plurality of similar markers and for achieving high accuracy in determining the 6-DOF-pose of the marker. The variation of the intensity profile along a circular path around the circle center point is advantageous for determining a 2D correspondence between the marker specimen and its representation in the camera image.

In a further refinement, the intensity profile is constant along any radial path starting at the circle center point and extending radially outward from the circle center point along a defined distance.

This refinement is advantageous, because it facilitates image analysis and allows for higher accuracy in an efficient manner. In some exemplary embodiments, the intensity profile is constant along any radial path starting at the circle center point and extending radially outward up to a predefined radius, which is smaller than the known radius of the circular contour. In these exemplary embodiments, the marker pattern may be divided in subsections forming an inner circle and a number of outer rings. An advantage of these exemplary embodiments is the increased number of codes that can be used for optically differentiating between a plurality of markers.

In a further refinement, the first nominal marker pattern comprises an intensity profile that varies in accordance with a function that results from a linear combination of a limited number of sinusoidal components along a circular path around the circle center point. Preferably, the limited number of sinusoidal components is less than 10, more preferably less than 5 and even more preferably not higher than 3.

According to this refinement, the marker pattern comprises an intensity profile that can mathematically be described as a sum of a limited number of sinusoidal components. In particular, the intensity pattern can be described by a Fourier series having a limited number of sinusoidal components. This refinement allows for a very efficient determination of the marker pose with a particular high accuracy. This refinement is advantageous for establishing a characteristic marker feature and for determining a correspondence between said characteristic marker feature and its respective image representation.

In some exemplary embodiments, the marker pattern may be a grey-scale pattern, which allows a very cost-efficient implementation of the new system and method. In other exemplary embodiments, the marker pattern may comprise at least three different color components, which helps to increase information density might advantageously be used as a further coding information.

It goes without saying that the features mentioned above and those yet to be explained below cannot only be used in the respective combinations disclosed, but also in different combinations or alone without departing from the scope of the present invention.

BRIEF DESCRIPTION OF THE DRAWINGS

Further features and advantages will be apparent from the following detailed description. Unless otherwise defined, all technical and scientific terms have the meaning as commonly understood by one of ordinary skill in the art. In the drawings.

DESCRIPTION OF PREFERRED EMBODIMENTS

Figure 1:
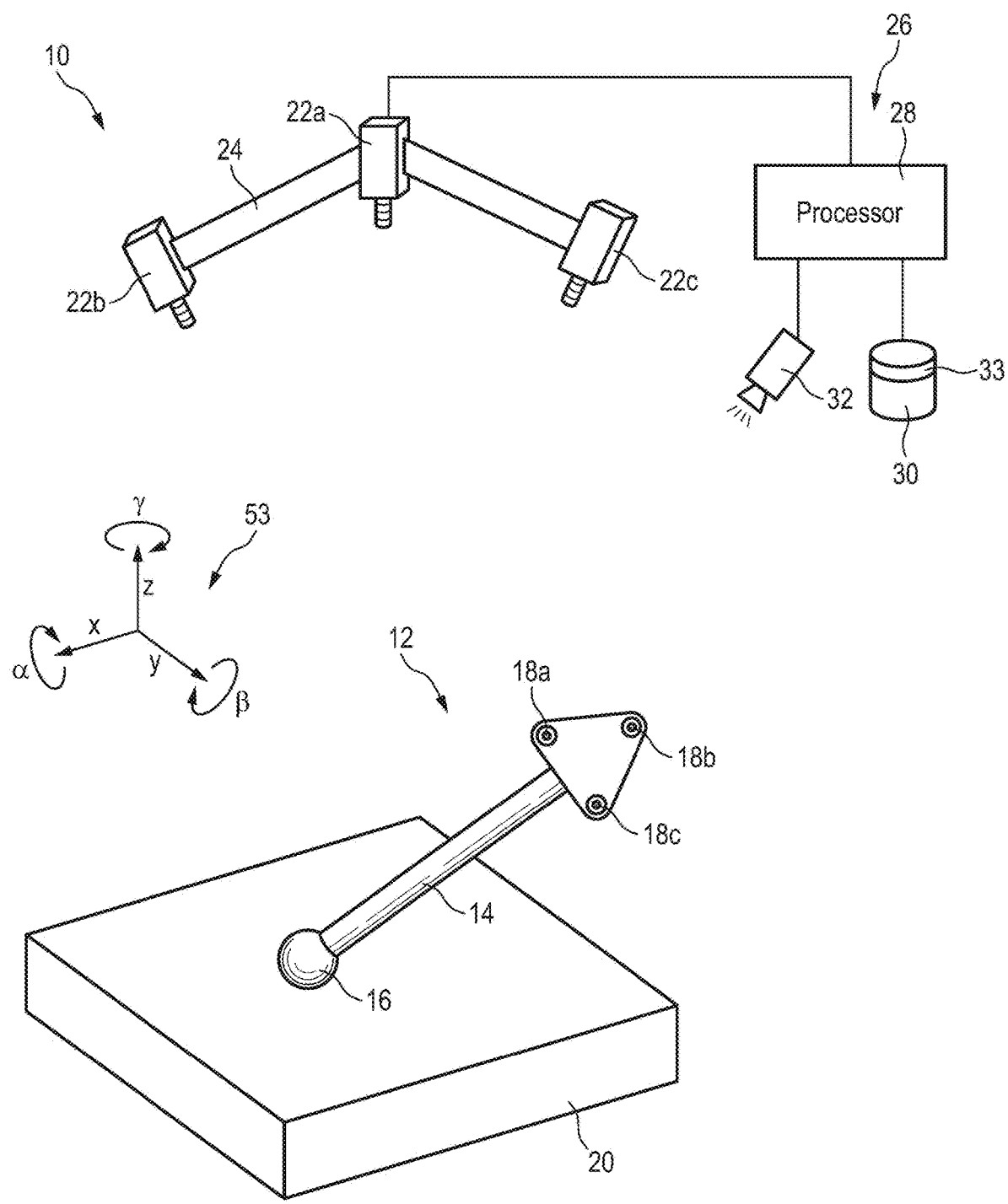
FIG. 1 shows a simplified schematic illustration of an exemplary embodiment of a system implementing the method.

In FIG. 1, an exemplary embodiment of the new system is shown in a simplified form and designated by reference number 10 in its entirety. System 10 is designed and configured for detecting the 6-DOF-pose including the 3D position of a hand-operated tool 12. Accordingly, tool 12 is an object having a position and an orientation in space, which is to be determined by means of system 10. System 10 may implement exemplary embodiments of the new method, as will be explained in the following.

In this exemplary embodiment, tool 12 comprises a handle 14 which can be held and operated by a human or a robot (not illustrated). A ball 16 is arranged on a distal end of handle 14. At the proximal end, a plate carrying three artificial markers 18a, 18b, 18c is arranged. In this exemplary embodiment, tool 12 is designed and configured for identifying measurement points on a measurement object 20, such as a car body part or any other measurement object. Accordingly, system 10 and tool 12 together may form a hand-operated or robot-operated coordinate measurement device that can advantageously be used in industrial metrology applications.

In this exemplary embodiment, system 10 comprises three cameras 22a, 22b, 22c, which are arranged on a structure 24 in such a manner that at least one of cameras 22a, 22b, 22c has a field of view for taking images of tool 12 with markers 18a, 18b, 18c, while tool 12 is used on measurement object 20. Other exemplary embodiments may involve only one camera 22, two cameras or any other suitable number of cameras. The cameras might be configured to capture greyscale images, color images, infrared images or any useful combination thereof. The cameras are connected to a control and evaluation unit 26 having a processor 28 and a memory 30. In general, the connection might be an electrical and/or optical cable. Additionally or as an alternative, one or more cameras 22 might be connected to control and evaluation unit 26 in a wireless manner.

Control and evaluation unit 26 is configured to control the cameras and to process image data provided by the cameras. In this exemplary embodiment, control and evaluation unit 26 is designed and configured for determining the 6-DOF-pose of tool 12 in accordance with embodiments of the new method explained further below. Other embodiments may be restricted to determine the position of an object in space rather than the whole 6-DOF-pose.

In some exemplary embodiments, control and evaluation unit 26 may control illumination 32, which may include LED lamps or any other suitable lamps generating light in the visible and/or infrared range. While illumination control by control and evaluation unit 26 is advantageous, other exemplary embodiments might be implemented without dedicated illumination control.

In some exemplary embodiments, control and evaluation unit 26 is a general purpose computer, such as a commercially available personal computer operating under Windows®, Linux, MacOS and memory 30 may store a computer program comprising program code that is designed and configured for implementing embodiments of the new method in combination with at least one artificial marker and at least one camera 22. Other embodiments of the new system may use a special purpose computer optimized for the control and evaluation task described further below. In addition, memory 30 may store a data set 33 that describes individual characteristics of the selected specimens of the artificial markers 18a, 18b, 18c, which have been individually measured. In some exemplary embodiments, data set 33 may be stored on a replaceable data carrier, such as a SD card, Compact Flash drive etc. The replaceable data carrier (not shown here) may be bundled with the associated specimens of artificial markers, so that the data set 33 can easily be replaced, if a specimen of a marker is replaced.

Some exemplary embodiments of the new system and method may employ a single marker attached to the object, which is particularly advantageous for small objects having a limited surface area. Using two, three or even more markers, however, allows for improved accuracy and also helps to detect and track the 6-DOF-pose of an object under circumstances, where parts of the object might be hidden from the camera field of view.

Figure 2:
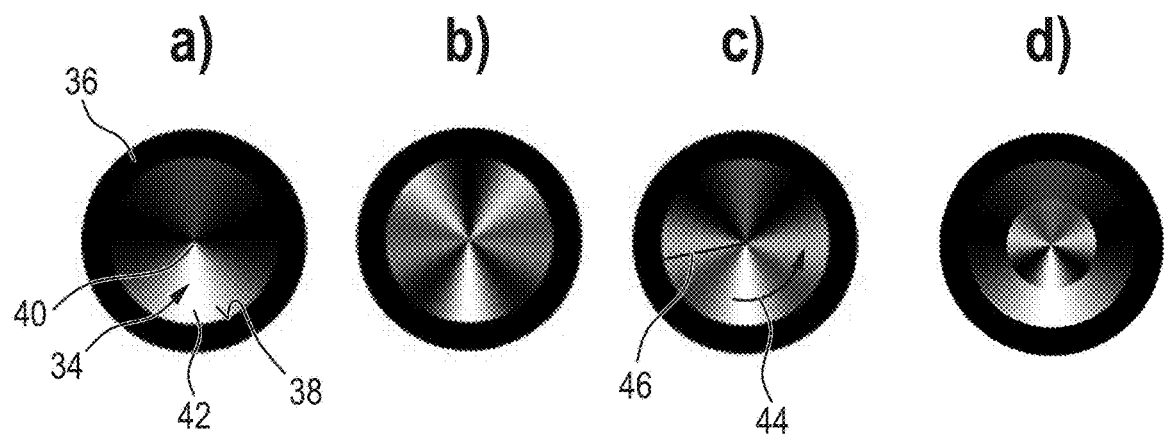
FIG. 2 shows four exemplary embodiments of artificial markers which can advantageously be used in the method and system of FIG. 1.

FIG. 2 shows some exemplary embodiments of currently preferred 2D markers. In the embodiments shown, the markers each comprise an inner marker area 34 and an outer background area 36, although other exemplary embodiments might be implemented without outer background area 36. While inner marker area 34 and outer background area 36 advantageously have a circular contour 38 in the preferred embodiments, inner marker area 34 and/or outer background area 36 might have a different form. For example, inner marker area 34 and/or outer background area 36 might be a square, triangle, hexagon or may have any other form. In preferred embodiments, circular contour 38 has a defined lateral dimension, such as radius R (cf. FIG. 6), and defines a circle center point 40.

In the preferred embodiments, inner marker area 34 comprises a marker pattern 42 with an intensity profile that varies substantially continuously along circular path 44 around circle center point 40. Accordingly, marker pattern 42 may be perceived as analog or almost analog, although marker pattern 42 may be produced from a plurality of dots or pixels. In some preferred embodiments, the intensity profile is constant along any radial path 46 starting at the circle center point and extending radially outward (cf. FIG. 2c). As can be seen in FIG. 2d, inner marker area 34 may comprise a plurality of marker patterns, which are arranged concentrically with respect to each other.

Figure 6:
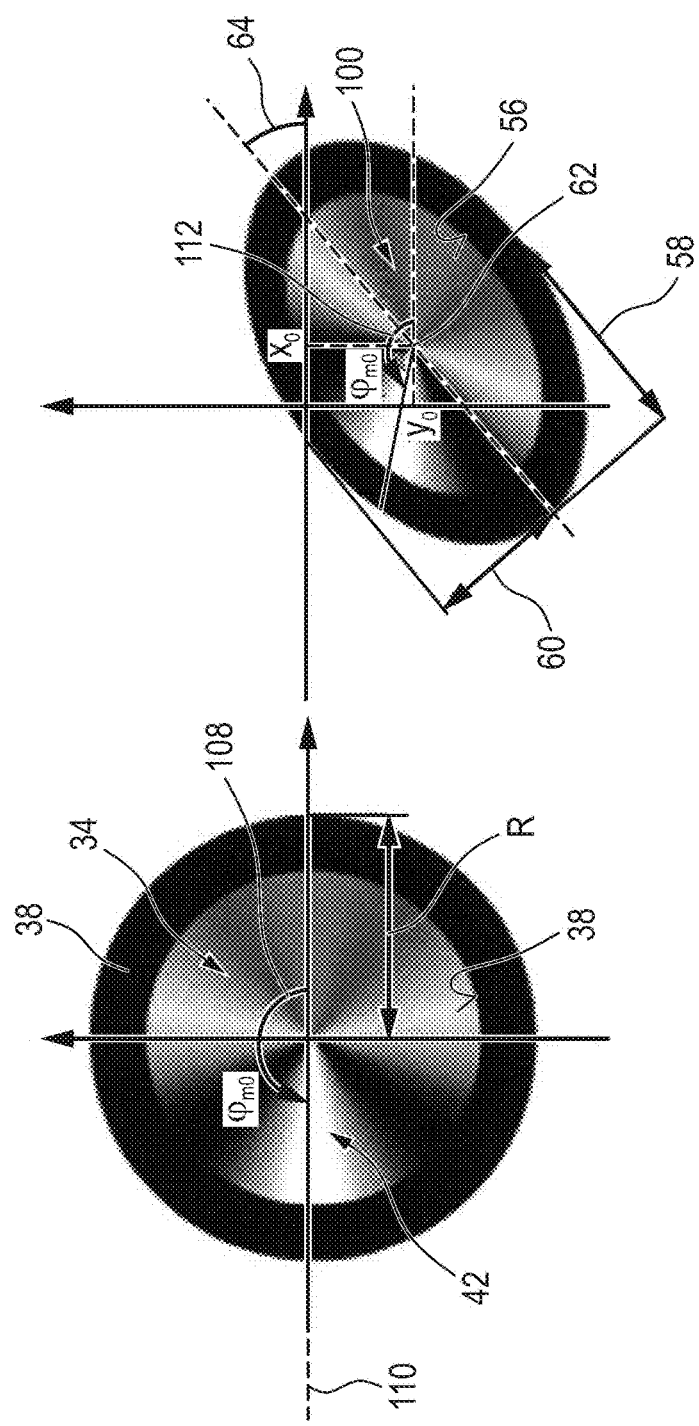
FIG. 6 shows a simplified illustration for explaining advantageous embodiments of the method.

In some preferred embodiments, the intensity profile along circular path 44 varies in accordance with a function that results from a linear combination of a limited number of sinusoidal components. By way of example, FIG. 6 shows a marker with an intensity profile that varies along a circular path 44 in accordance with a function that is shown in FIG. 7a). Different intensity profiles for different markers may be used as individual codes that allow to distinguish individual markers one from the other in the image analysis processing. Preferably, the number of sinusoidal components is 1, 2 or 3, i.e. less than 4.

Figure 8:
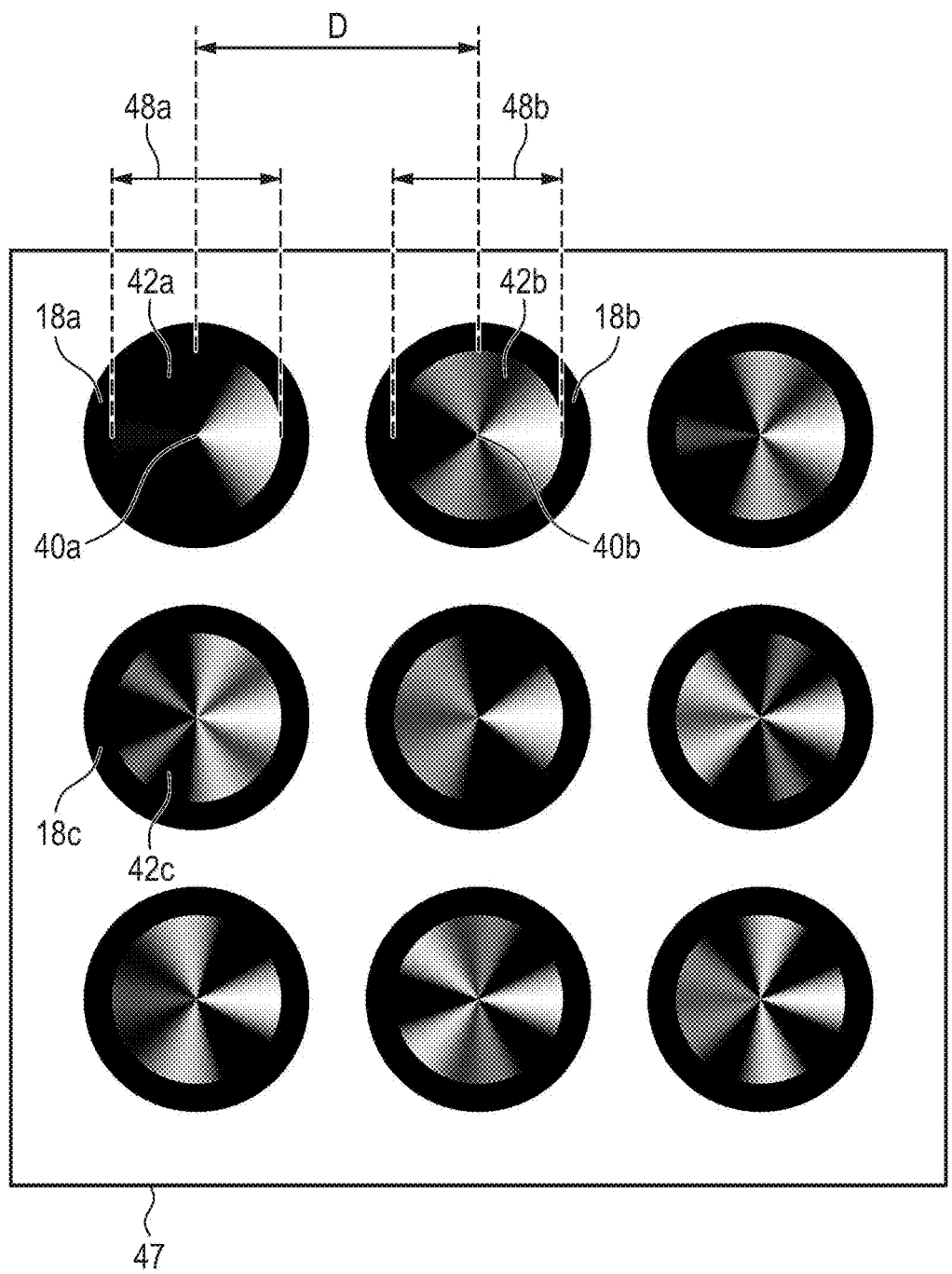
FIG. 8 shows an optical tracking target carrying 9 artificial markers in accordance with one exemplary embodiment.

FIG. 8 shows an exemplary embodiment of a target plate comprising 9 artificial markers arranged in columns and rows on a common support plate 47. For sake of simplicity, reference numbers 18a, 18b, 18c are used again in order to designate 3 exemplary markers from the plurality of markers. Support plate 47 may be made of metal, ceramics and/or any synthetic material. In some exemplary embodiments, common support plate 47 may be a fiber-reinforced plastic material and/or a ceramic material having a low thermal coefficient of expansion. The markers may be directly printed onto common support plate 47. Each marker may have an intensity profile that is different from the respective intensity profiles of the other markers, so that each marker is individually coded. Accordingly, each marker 18a, 18b, 18c has an individual (nominal) marker pattern 42 that is different from the (nominal) marker patterns of the other markers on support plate 47 in this exemplary embodiment. The nominal marker patterns each define nominal characteristics for each marker. Other embodiments may comprise a plurality of markers that have identical nominal marker patterns, but even in this case, the individual positions of the respective marker center points will be different.

Moreover, each marker 18a, 18b, 18c may have an individual marker pattern 42a, 42b, 42c that differs from the respective nominal marker pattern as a result of variations occurred in the production process and/or as a result of variations in temperature, humidity or other environmental factors. Therefore, each marker 18a, 18b, 18c on support plate 47 is considered here as an individual specimen of a respective marker type having predefined nominal characteristics. Accordingly, each marker specimen 18a, 18b, 18c may have individual characteristics that can be different from the nominal characteristics defined by the respective nominal marker pattern. By way of example, the specimen of marker 18a may have a lateral dimension 48a that differs slightly from a respective nominal dimension 2R, with R being the nominal radius of the circular inner marker area. Moreover, the relative distance D from center point 40a of marker specimen 18a to center point 40b of marker specimen 18b may deviate from a nominal relative distance. An orientation of each respective marker pattern 42a, 42b, 42c around the respective center point may also vary for each specimen on support plate 47. Therefore, individual characteristics of the marker specimens are individually measured and provided as part of the data set 33 for subsequent image analysis in the preferred embodiments.

In the following, an exemplary embodiment of the new method is explained. According to steps 49, 49', the selected marker specimens on the common support plate ("target") are individually measured prior to and/or after the target comprising the marker specimens is attached to the object in step 50. According to step 52, an image of the target including the marker specimens is captured using at least one of cameras 22a, 22b, 22c, while the target is attached to the object. The captured image is supplied to processor 28 for image analysis and determination of the position/pose of the target in space. The target may have any position along the x,y,z-axes of a coordinate system 53, and it may be rotated about any of the x,y,z-axes by a rotation angle α, β, γ (cf. FIG. 1).

The position of the target relative to the coordinate system 53 is determined by evaluating at least one specimen on the target. A box 54 shown in dashed line shows preferred steps for evaluating the at least one specimen. Accordingly, the steps in box 54 may be executed for one or more specimens 18a, 18b, 18c. Executing the steps for more than one specimen is beneficial because it helps to increase accuracy in the determination of the position of the target and, consequently, of the object.

According to step 55, an elliptical representation of circular contour 38 of a selected specimen in the image is detected. As the skilled person will readily understand, and as is illustrated in FIG. 6, the circular marker contour 38 will typically appear as an ellipse 56 due to perspective distortion. The elliptical representation or ellipse 56 can be characterized by ellipse parameters, namely a semi-major axis 58, a semi-minor axis 60, an ellipse center point 62 defined by two coordinates $x_e$, $y_e$ in a 2D image-coordinate system, and by an ellipse orientation 64, which can advantageously be defined as an angle between a first axis co-linear with the semi-major axis and a second axis of the image coordinate system. Semi-major axis 58, semi-minor axis 60, the 2D-coordinates of the ellipse center point 62 and ellipse orientation 64 define a first, second, third, fourth and fifth parameter characterizing the elliptical representation of the circular marker specimen in the camera image.

Figure 4:
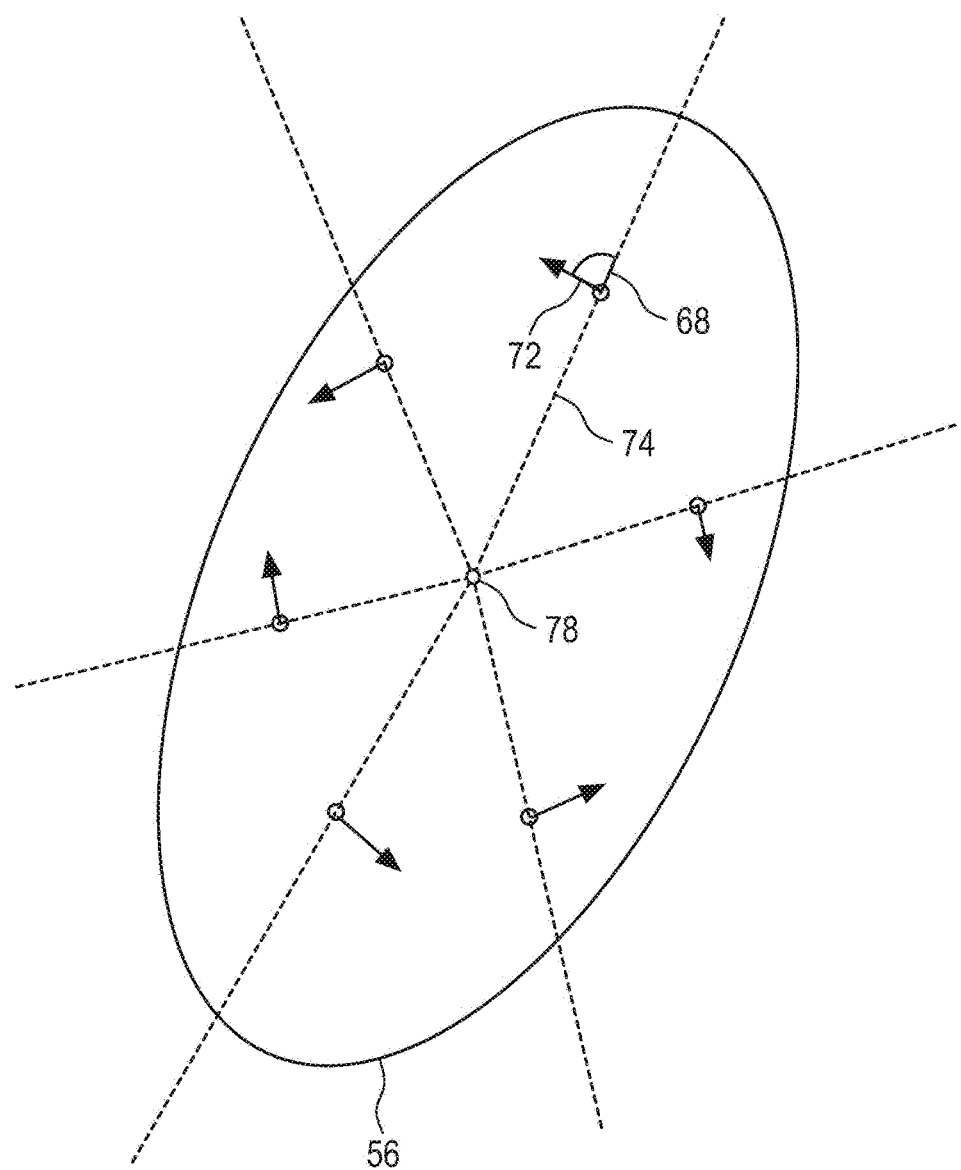
FIG. 4 is a simplified illustration of an elliptical representation of a 2D artificial marker for explaining a preferred exemplary embodiment using gradient vectors.

According to step 66, first image values from the elliptical representation of inner marker area 34 in the camera image are sampled. FIG. 4 shows a simplified illustration of elliptical representation 56 and sampled image values 68. According to step 70, a gradient vector 72 is determined for each sampled first image value 68. Gradient vector 72 represents a direction of maximum change in the intensity profile at the respective image value 68. In the exemplary embodiments, the intensity profile of inner marker area 34 does not vary along any radial path starting at the circle center point and extending radially outward. Therefore, gradient vector 72 advantageously points in a direction that is orthogonal to a radial line, as it is indicated in FIG. 4. Accordingly, orthogonal straight lines 74 may be determined in step 76 for each of sampled first image values 68, with each orthogonal straight line 74 extending in a radial direction and being orthogonal with respect to one gradient vector 72. The plurality of orthogonal lines 74 define a point of intersection 78, which may be used as a relevant ellipse center point in some preferred embodiments according to step 80. In practice, it might happen that the plurality of orthogonal lines 74 do not converge at one point of intersection 78. Therefore, the relevant ellipse center point may be determined as a point that minimizes the sum of distances to each of orthogonal lines 74.

It should be noted that point of intersection 78 might be slightly dislocated from "true" ellipse center point 62 of ellipse 56. Therefore, point of intersection 78 may be interpreted differently in some preferred embodiments and advantageously be used as an image representation of circular marker center point 40, while "true" ellipse center point 62 is determined as an additional information in order to achieve even higher accuracy, as will be explained further down below. Ellipse center point 62 may be determined using conventional image processing techniques. For example, ellipse center point 62 may be determined as point of intersection between semi-major axis 58 and semi-minor axis 60, with these two ellipse axes being detected using image analysis techniques.

The first image values are preferably selected with a sufficient distance from expected point of intersection 78 within inner marker area 34. The image values might be selected in various ways. For example, the image values may be selected such that they surround the expected point of intersection in a substantially uniform manner. Additionally or alternatively, first image values might be selected randomly and/or sample image values might be selectively placed in areas where the intensity profile changes particularly strong.

In some preferred embodiments, orthogonal lines 74 may be weighted in step 80. For example, if a gradient vector corresponding to a respective line 74 is rather weak (which means that the intensity profile does not change very strongly at the selected image value relative to adjacent image values), the respective line 74 might be treated with a smaller weight compared to other orthogonal lines associated with stronger gradient vectors.

Figure 5:
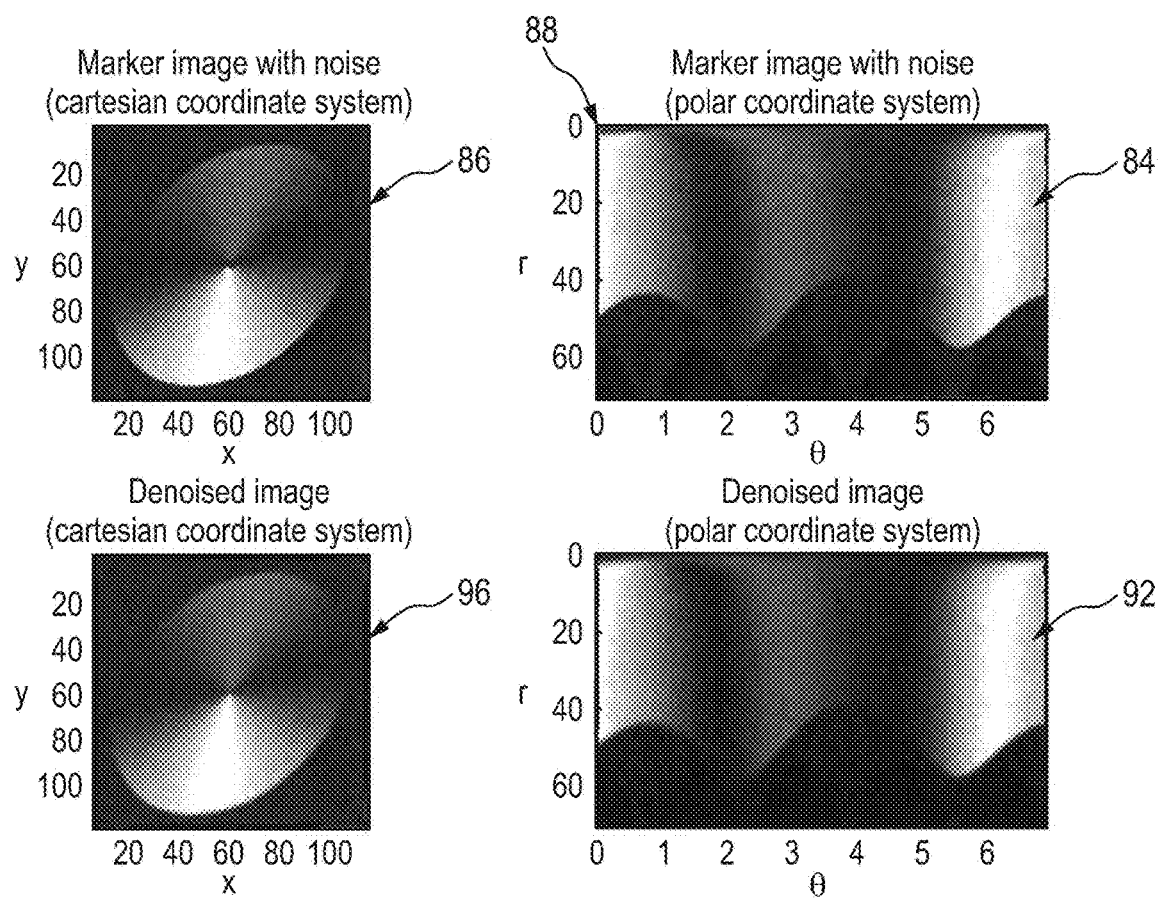
FIG. 5 shows four images for explaining an advantageous de-noising approach in accordance with some exemplary embodiments.
Figure 3:
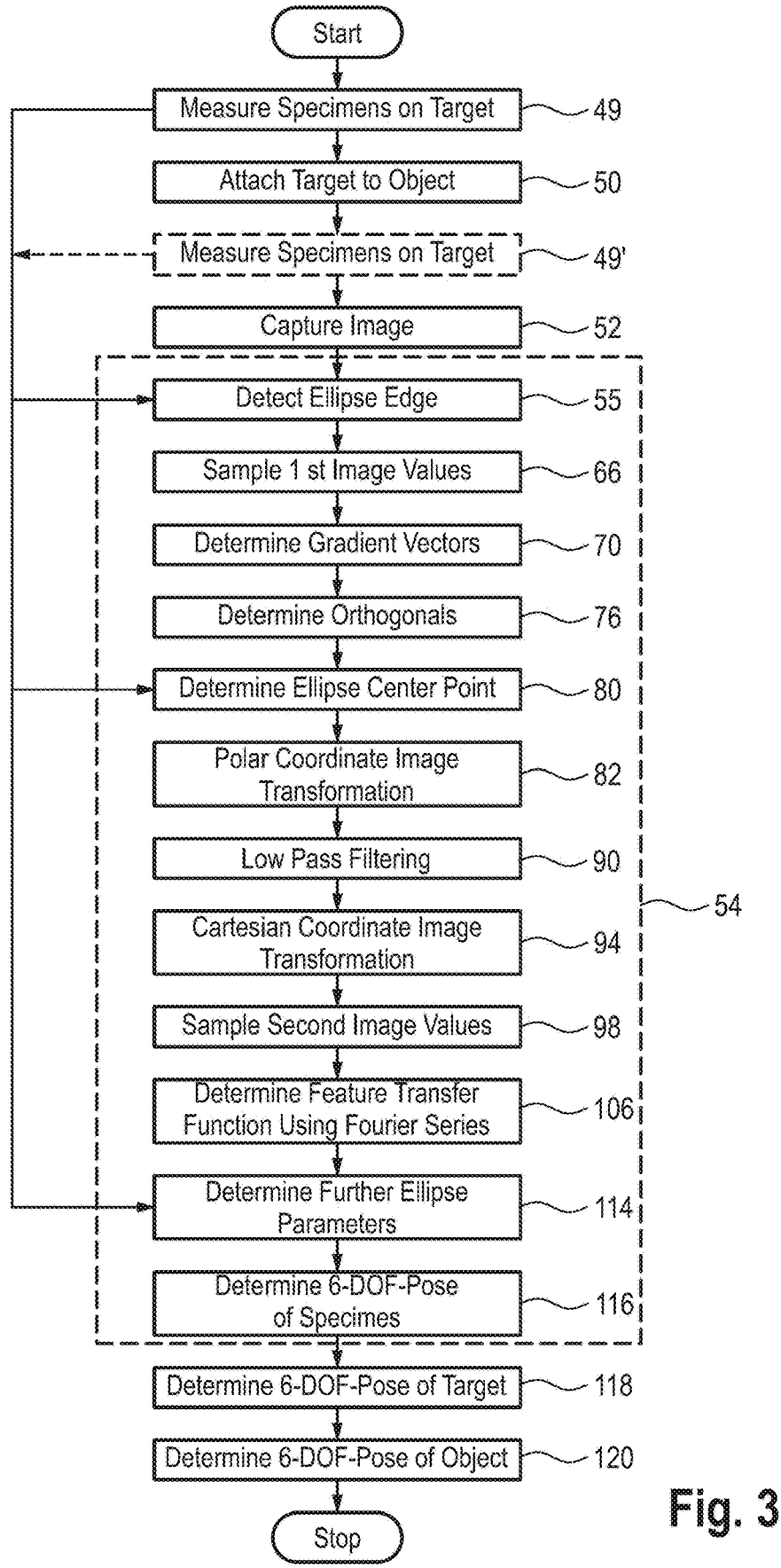
FIG. 3 shows a simplified flow diagram for explaining an exemplary embodiment of the method.

According to step 82 and with reference to FIG. 5, a polar coordinate image 84 may be determined by means of a coordinate transformation from Cartesian coordinates to polar coordinates applied to marker image 86. Preferably, relevant ellipse center point 78 or true ellipse center point 62 may be used as polar coordinate origin 88. According to step 90, a low pass filter is applied to polar coordinate image 84 for removing high frequency noise. As a result, a de-noised image 92 is obtained in the same polar coordinate system. According to step 94, the filtered polar coordinate image 92 is re-transferred into Cartesian coordinates and a corresponding de-noised Cartesian image 96 is obtained.

In a preferred embodiment, a maximum radial distance from ellipse center point 62 or, alternatively, from point of intersection 78 is defined in order to select an image area for further image analysis. The radial distance may be taken as a maximum coordinate value in the polar coordinate system. Following that, a desired resolution for the polar coordinate image may be defined and a number $N_r$ of sample values along the r-axis and a number $N_\theta$ of sample values along the $\theta$-axis is selected. With point of intersection 78 (or ellipse center point 62) being defined as the origin of the polar coordinate system, the coordinate transformation from Cartesian coordinates to polar coordinates is carried out in accordance with:

$$x_{r,\theta} = x_0 + r \cos \theta$$

$$y_{r,\theta} = y_0 + r \sin \theta,$$

with $x_0$, $y_0$ being the coordinates of the ellipse center point 78 and with $$r = r_{max} \cdot n_r / N_r,$$

$$\theta = 2\pi \cdot n_\theta / N_\theta.$$

where $n_r = 0, 1, 2, \ldots N_{r-1}$ and $n_\theta = 0, 1, 2, \ldots N_{\theta-1}$.

In preferred embodiments, image intensity values from the original Cartesian image are interpolated in order to achieve the respective image values of the polar coordinate image 84, for example by using a bilinear interpolation algorithm. Following that, low pass filtering step 90 is carried out. Any suitable standard digital filter algorithm might be used here. Thereafter, de-noised polar coordinate image 92 is re-transformed into Cartesian coordinates, wherein individual image values of de-noised Cartesian image 96 are again determined by interpolation from respective image values of image 92.

In some exemplary embodiments, original image 86 might be over-sampled before the polar coordinate transformation.

According to step 98, second image values are then sampled from de-noised image 96 in preferred exemplary embodiments. Preferably, the second image values are sampled along an elliptical path around point of intersection 78 and/or along an elliptical path around ellipse center point 62 in order to determine a transfer function relating marker pattern 42 to respective image pattern 100 in the elliptical representation (cf. FIG. 6).

Figure 7:
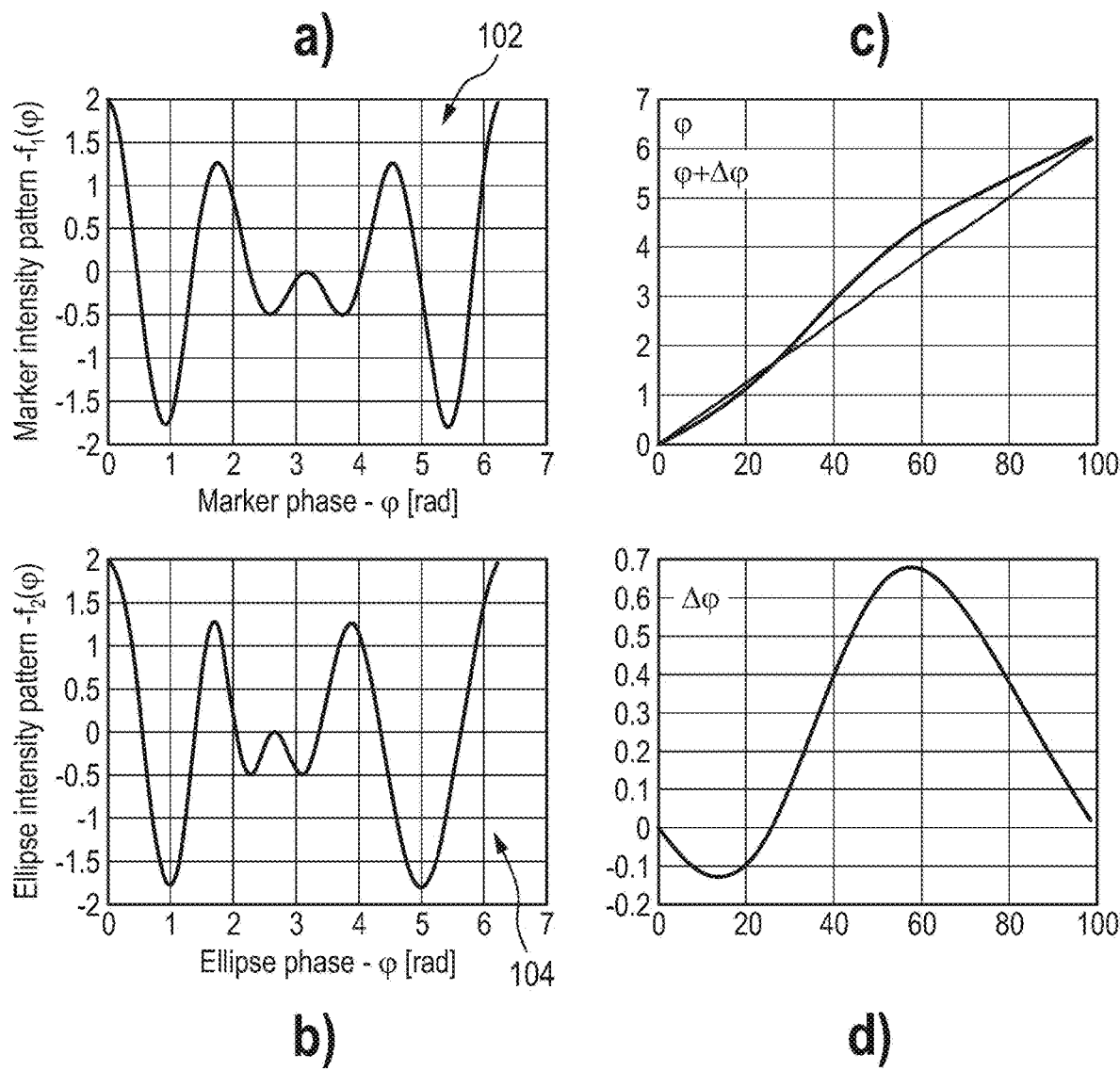
FIG. 7 shows intensity profiles of a marker and of its elliptical representation according to FIG. 6.

By comparing sampled image pattern 100 and known marker pattern 42, it is possible to determine a transfer function that relates those two patterns. By way of example, reference is made to FIG. 7. FIG. 7a) shows an intensity profile 102 along a circular path around circle center point 40. FIG. 7b) shows the intensity profile 104 along a respective path around ellipse center point 62 or, preferably, around relevant point of intersection 78. As will be appreciated, the two intensity profiles 102, 104 are similar to each other, but not identical. In fact, intensity profile 104 is a distorted version of intensity profile 102 due to the perspective projection. Intensity profiles 102, 104 are generally related in mathematical terms as $$f_2(\varphi) = f_1(\varphi + \Delta\varphi(\varphi)),$$

with $\Delta\varphi(\varphi)$ being a non-linear function representing the distortion. In some preferred embodiments, the function $\Delta\varphi(\varphi)$ is approximated by a Fourier series $$\Delta\varphi(\varphi) = a_0 + a_1 \cos(\varphi) + a_2 \cos(2\varphi) + \ldots + a_N \cos(N\varphi) + b_1 \sin(\varphi) + \ldots + b_N \sin(N\varphi).$$

The Fourier series coefficients can be determined by solving a set of non-linear equations $$f_2(\varphi_m) - f_1(\varphi_m + \Delta\varphi(\varphi_m)) = 0$$

for $m = 1, 2, \ldots, N$, with N being the number of sample values.

FIG. 7d) illustrates the phase difference between the intensity profiles 102, 104 resulting from the perspective projection.

Therefore, a feature transfer function can be determined according to step 106 in order to establish the relationship between marker pattern 42 and image pattern 100. In some preferred embodiments, the feature transfer function is used for determining a particular correspondence between a selected marker feature and its image representation. For example, FIG. 6 shows marker pattern 42 with a characteristic feature 108 in the form of phase $\varphi_{m0}$ of radial line 110 having the highest intensity values in the marker pattern. The corresponding representation 112 in the camera image may advantageously be used for determining the correspondence between the marker feature 108 and its image representation 112.

According to step 114 further ellipse parameters, such as semi-major axis 58, semi-minor axis 60 and ellipse orientation 64 are determined. Following that, the 6-DOF-pose of the selected marker specimen in space is determined, as is indicated in step 116, as follows: As is known to those skilled in the art, a circular contour 38 can be described in a parametrical form as $$x_m(\varphi_m) = R \cos(\varphi_m),$$

with $\varphi_m$ being a variable parameter and R being the known radius. Following that, a selected marker point on circular contour 38 can be expressed as $$x_m = R \cos(\varphi_n),$$

$$y_m = R \sin(\varphi_n).$$

Likewise, the elliptical representation can be described in parametrical form as follows:

$$x_1(\varphi_e) = R_x \cos(\varphi_e),$$

$$y_1(\varphi_e) = R_y \sin(\varphi_e),$$

$$x_e(\varphi_e) = x_1(\varphi_e)\cos(\theta) + y_1(\varphi_e)\sin(\theta) + x_0,$$

$$y_e(\varphi_e) = x_1(\varphi_e)\sin(\theta) + y_1(\varphi_e)\cos(\theta) + y_0,$$

with $\varphi_e$ being a variable parameter and $R_x$, $R_y$, $x_0$, $y_0$ and $\theta$ being ellipse parameters that can be derived from the camera image. In particular, $R_x$ is the semi-major axis of the ellipse, $R_y$ is the semi-minor axis of the ellipse, $x_0$, $y_0$ are the coefficients of the ellipse center point, and $\theta$ is a coefficient representing ellipse orientation.

In addition to those five ellipse parameters, the correspondence between marker parameter $\varphi_{m0}$ and ellipse parameter $\varphi_{e0}$ is determined on the basis of the transfer function from step 106. The κ-DOF-pose of the marker specimen in space can then be determined from the six ellipse parameters $R_x$, $R_y$, $x_0$, $y_0$, $\theta$, $\varphi_{e0}$.

Generally, the relationship between the 6-DOF-pose of the known marker specimen and the ellipse parameters can be defined as $$(R_x, R_y, x_0, y_0, \theta, \varphi_{e0}) = f(t_x, t_y, t_z, \alpha, \beta, \gamma),$$

with $t_x$, $t_y$, $t_z$ being the coordinates of the marker center point in 3D space and $\alpha$, $\beta$, $\gamma$ being the rotation angles describing marker specimen orientation in space. For a particular marker specimen having a particular marker image pattern, a correspondence between selected points $x_m$, $y_m$ on circular marker contour 38 and respectively selected points $x_e$, $y_e$ on ellipse contour 56 are a function of the marker 6-DOF pose $$[x_e, y_e] = f(t_x, t_y, t_z, \alpha, \beta, \gamma, x_m, y_m).$$

Using the ellipse parameters derived from the camera image, it is possible to set up a system of equations relating several points $x_e$, $y_e$ on ellipse contour 56 to respective points $x_m$, $y_m$ on circular marker contour 38. There are six unknown marker parameters and two equations for each correspondence. Therefore, by establishing correspondences between three or more points $x_e$, $y_e$ on ellipse contour 56 and respective three or more points $x_m$, $y_m$ on circular marker contour 38, one can determine the 6-DOF pose of the marker specimen by solving the set of equations. In some preferred embodiments, the set of equations is solved by using a numerical approach, such as the Levenberg-Marquardt approach. As a result, the coordinates of the selected specimen center point in space and the rotation angles of the selected specimen in space, i.e. its 6-DOF-pose in space, are obtained from the ellipse parameters derived from the camera image and the known marker parameters. Based on the knowledge of the 6-DOF-pose of the marker, the 6-DOF-pose of the target is then determined in step 118. Based on the pose of the target, the pose of the object is determined in step 120.

In some preferred embodiments, additional correspondences are established by relating marker circle center point 40, determined as point of intersection 78 in accordance with FIG. 4, and ellipse center point 62 as mentioned before. This helps to increase accuracy, as already mentioned before.

Advantageously, the individual characteristics of each specimen measured in step 49/49' are used instead of its respective nominal characteristics in the image analysis and evaluation. For instance, the individual position of the respective center point 62 of a selected specimen is used instead of the nominal position of the respective center point. The individual position may deviate from the nominal position on the support plate by 10 μm along the x- and y-axes, for instance. Taking the individual position into account instead of the nominal position helps to increase the accuracy of the final determination of the object position. Likewise, the measured distance D may advantageously be used instead of a nominal distance, when more than one specimen is evaluated in accordance with box 54. Any deviation from the nominal circularity, as measured on the selected specimen, may advantageously be used in steps 55, 70, 76, 80, 82, 106, 114, and 116.

What is claimed is:

1. A method for determining a 3D position of an object in space, the method comprising the steps of:
    arranging a first specimen of a first artificial marker on the object, wherein the first artificial marker defines a first nominal marker pattern with first nominal characteristics, and wherein the first specimen embodies the first nominal marker pattern with first individual characteristics,
    providing at least one camera and a coordinate system relative to the at least one camera,
    obtaining a data set that is representative for the first specimen, wherein the data set comprises first measured data values representing the first individual characteristics as individually measured on the first specimen prior to the arranging,
    capturing at least one image of the first specimen arranged on the object using the at least one camera, wherein the at least one image comprises an image representation of the first nominal marker pattern as embodied by the first specimen,
    detecting and analyzing the image representation using the data set, thereby producing a number of first position values representing the 3D position of the first specimen relative to the coordinate system, and
    determining the 3D position of the object on the basis of the first position values.

2. The method of claim 1, wherein:
    the first nominal marker pattern defines a first lateral dimension, and
    the first measured data values represent the first lateral dimension as individually measured on the first specimen.

3. The method of claim 1, further comprising:
    arranging a second specimen of a second artificial marker on the object,
    wherein the second artificial marker defines a second nominal marker pattern with second nominal characteristics, and wherein the second specimen embodies the second nominal marker pattern with second individual characteristics.

4. The method of claim 3, wherein:
the first nominal marker pattern defines a first center point,
the second nominal marker pattern defines a second center point, and
the first measured data values further represent a position of the first center point relative to the second center point as individually measured on the first and second specimens.

5. The method of claim 3, wherein the first specimen and the second specimen are fixedly arranged on a common support plate.

6. The method of claim 5, wherein:
the common support plate comprises a plurality of further specimens of further artificial markers, and
the first specimen, the second specimen, and the plurality of further specimens form a defined target plate pattern on the common support plate.

7. The method of claim 3, wherein the first nominal marker pattern and the second nominal marker pattern are different from one another.

8. The method of claim 1, wherein:
the first nominal marker pattern comprises a first circular contour having a circle radius and a circle center point, and
the first individual characteristics comprise the circle radius and a position of the circle center point as individually measured on the first specimen.

9. The method of claim 8, wherein:
the first nominal marker pattern comprises an intensity profile that varies by a plurality of increments along a circular path around the circle center point, and
the intensity profile defines a first characteristic feature as part of the first nominal characteristics.

10. The method of claim 9, wherein the intensity profile is constant along any radial path starting at the circle center point and extending radially outward from the circle center point along a defined distance.

11. The method of claim 8, wherein the first nominal marker pattern comprises an intensity profile that varies in accordance with a function that results from a linear combination of a limited number of sinusoidal components along a circular path around the circle center point.

12. The method of claim 1, wherein:
the image representation comprises a perspective distortion of the first specimen as a result of a non-orthogonal viewing angle of the at least one camera relative to the first specimen, and
the step of producing a number of first position values comprises determining a correspondence between the first nominal marker pattern, as embodied by the first specimen, and the perspective distortion.

13. The method of claim 1, wherein the step of producing a number of first position values comprises determining a 6-DOF-pose of the first specimen relative to the coordinate system.

14. The method of claim 1, wherein the step of providing the data set comprises a step of individually measuring the first specimen prior to arranging the first specimen on the object.

15. The method of claim 1, wherein the step of providing the data set comprises a step of individually measuring the first specimen after arranging the first specimen on the object.

16. A method for determining a 3D position of an object in space, the method comprising the steps of:
providing the object with an optical-tracking target, wherein:
the optical-tracking target includes a first specimen of a first artificial marker and a second specimen of a second artificial marker,
the first specimen has a first marker pattern with first individual characteristics, and
the second specimen has a second marker pattern with second individual characteristics,
providing at least one camera and a coordinate system relative to the at least one camera,
obtaining a data set that is representative for the first specimen and the second specimen, wherein the data set includes,
first measured data values representing at least some of the first individual characteristics as individually measured on the first specimen prior to the optical-tracking target being arranged on the object, and
second measured data values representing at least some of the second individual characteristics as individually measured on the second specimen prior to the optical-tracking target being arranged on the object,
capturing at least one image of the optical-tracking target on the object using the at least one camera, wherein the at least one image includes an image representation of the first and second specimens,
detecting and analyzing the image representation using the data set, thereby producing a number of target position values representing the 3D position of the optical-tracking target relative to the coordinate system, and
determining the 3D position of the object on the basis of the target position values.

17. The method of claim 16, wherein the step of providing the data set comprises a step of individually measuring the first and second specimens prior to providing the object with the optical-tracking target.

18. A system for determining a 3D position of an object in space, the system comprising:
a first specimen of a first artificial marker configured to be arranged on the object, wherein:
the first artificial marker defines a first nominal marker pattern with first nominal characteristics, and
the first specimen embodies the first nominal marker pattern with first individual characteristics,
at least one camera, wherein a coordinate system is defined relative to the at least one camera, and
a control and evaluation unit having a processor and a data memory, wherein:
the data memory stores a data set that is representative for the first specimen, wherein the data set includes first measured data values representing the first individual characteristics as individually measured on the first specimen prior to the first specimen being arranged on the object,
the processor is programmed to capture at least one image of the first specimen arranged on the object using the at least one camera, the at least one image comprising an image representation of the first nominal marker pattern as embodied by the first specimen,
the processor is further programmed to detect and analyze the image representation using the data set from the data memory, thereby producing a number of first position values representing the 3D position of the first specimen relative to the coordinate system, the processor is further programmed to determine the 3D position of the object on the basis of the first position values.

19. The system of claim 18, wherein the processor is further programmed to acquire the data set prior to capturing the at least one image.

20. A non-transitory computer readable storage medium encoded with a computer program that, when executed on a processor of a control and evaluation unit connected to at least one camera, in order to determine a 3D position of an object in space, the object being provided with a first specimen of a first artificial marker, the first artificial marker defining a first nominal marker pattern with first nominal characteristics, and the first specimen embodying the first nominal marker pattern with first individual characteristics, performs the steps of:

defining a coordinate system relative to the at least one camera, capturing at least one image of the first specimen arranged on the object using the at least one camera, wherein the at least one image comprises an image representation of the first nominal marker pattern as embodied by the first specimen, retrieving a data set that is representative for the first specimen from a memory of the control and evaluation unit, wherein the data set comprises first measured data values representing the first individual characteristics as individually measured on the first specimen prior to the first specimen being arranged on the object, detecting and analyzing the image representation using the data set, thereby producing a number of first position values representing the 3D position of the first specimen relative to the coordinate system, and determining the 3D position of the object on the basis of the first position values.

* * * * *